United States Patent [19] [11] 4,143,205
Rowe, Jr. et al. [45] Mar. 6, 1979

[54] PHOSPHATIZED AND PAINTED METAL ARTICLES

[75] Inventors: Edward A. Rowe, Jr., Cheshire, Conn.; William H. Cawley, Painesville, Ohio

[73] Assignee: Diamond Shamrock Corporation, Cleveland, Ohio

[21] Appl. No.: 864,338

[22] Filed: Dec. 27, 1977

Related U.S. Application Data

[63] Continuation-in-part of Ser. No. 729,810, Oct. 5, 1976, abandoned, which is a continuation-in-part of Ser. No. 560,362, Mar. 20, 1975, abandoned.

[51] Int. Cl.[2] .......... C23F 7/08; C23F 7/10; C23F 7/26; B32B 15/18

[52] U.S. Cl. .......... 428/469; 148/6.15 R; 148/6.15 Z; 148/6.16; 148/31.5; 428/539

[58] Field of Search .......... 148/6.15 R, 6.16, 6.15 Z, 148/31.5; 428/469, 472, 539

[56] References Cited

U.S. PATENT DOCUMENTS

| | | | |
|---|---|---|---|
| 2,298,280 | 10/1942 | Clifford et al. | 148/6.15 R |
| 2,837,449 | 6/1958 | Blaser | 148/6.15 R |
| 3,063,877 | 11/1962 | Schiffman | 148/6.16 |
| 3,100,728 | 8/1963 | Vullo et al. | 148/6.15 R |
| 3,197,345 | 7/1965 | Vullo et al. | 148/6.15 R |
| 3,306,785 | 2/1967 | Hitchcock | 148/6.15 Z |
| 3,338,754 | 8/1967 | Vullo et al. | 148/6.15 R |
| 3,475,228 | 10/1969 | Parker et al. | 148/6.15 R |
| 3,502,511 | 3/1970 | Forsberg | 148/6.15 R |
| 3,615,895 | 10/1971 | Freyhold et al. | 148/6.15 R |
| 4,008,101 | 2/1977 | Rowe et al. | 148/6.15 R |

FOREIGN PATENT DOCUMENTS 1222351 8/1966 Fed. Rep. of Germany.

*Primary Examiner*—Harold Ansher
*Attorney, Agent, or Firm*—John J. Freer

[57] ABSTRACT

Metal substrates, and particularly ferrous metal substrates, are now protected by having on their surface composite coatings wherein the base coating comprises a water-insoluble phosphatized coating from an organic phosphatizing composition. Over the phosphatized base coating there is then deposited a topcoating that is typically a paint topcoating. However, a rinse coating, such as a chromic acid solution, may be used on the base coating prior to a paint coating. A highly desirable adherent, corrosion-resistant and water-insoluble composite coating thereby protects the substrate metal.

13 Claims, No Drawings

PHOSPHATIZED AND PAINTED METAL ARTICLES

CROSS-REFERENCE TO RELATED APPLICATION

This application is a Continuation-in-part of U.S. patent application Ser. No. 729,810, filed Oct. 5, 1976, and now abandoned, which in turn is a continuation-in-part of U.S. patent application Ser. No. 560,362, filed Mar. 20, 1975, and now abandoned.

BACKGROUND OF THE INVENTION

Phosphatizing carried on in water has typically provided drawbacks, including sludging and the need for a multi-step operation, to achieve dry coated articles. In an early attempt to overcome such problems, as described in U.S. Pat. No. 2,515,934, from 1 percent to 7 percent of the commercial phosphoric acid 85 percent syrup was used in an organic mixture, rather than in water. Representative of these mixtures was a 50/50 blend of acetone and carbon tetrachloride. With the blend, only a few steps were needed for phosphatizing.

As the use of chlorinated solvents in phosphatizing operations developed, it became recognized, as discussed, for example, in U.S. Pat. No. 3,197,345, that there was a water-based process, also called an "aqueous" method of phosphatizing metal articles, and on the other hand a solvent-based process, which was therein noted as the "dry" process. The latter process typically employed a solution of phosphoric acid in a chlorinated hydrocarbon solvent.

It was early recognized in the U.S. Pat. No. 2,515,934 patent, that the commercial phosphoric acid would introduce a small amount of water into organic phosphatizing compositions. Several techniques were developed to combat this problem, including the use of drying agents. Several of such concepts have been discussed in U.S. Pat. No. 3,338,754. Therein it was emphasized that small amounts of water are detrimental to the phosphate coatings obtained from the non-aqueous phosphatizing solutions.

The phosphatized coatings that were achieved had the drawback of being water sensitive. However, as has been discussed in U.S. Pat. No. 3,475,228, these phosphatized coatings could nevertheless be successfully topcoated with paint compositions based upon the same chlorinated hydrocarbon solvent for the paint as was used in the dry phosphatizing process.

One variation in the prior art efforts involves the addition of a stabilizing agent to a coating bath to prolong the formation of adherent coatings from the bath. In West German Pat. No. 1,222,351, the use of an agent such as dimethyl glyoxime, as a stabilizer, has been shown. The baths, even with stabilizer, are of dubious quality without the use of commercial ethanol. This necessarily introduces a minor amount of water into the coating composition. However, resulting coatings can display deleterious characteristics with topcoats.

In the past several years there has been an increasing interest in water-reducible coatings, spurred on by the advent of pollution requirements and Federal safety and health legislation. It would, therefore, be most desirable to obtain a phosphatized coating, with the advantages of the dry phosphatizing process, and then be able to couple this, through the advantage of a water-insoluble coating, with the subsequent deposition of a water-reducible coating. Further, commercially developed chrome rinse systems and the like for phosphatized coatings have been developed under strong economic forces that have dictated water-based rinse systems. It would thereby be most desirable to integrate a dry phosphatizing process, with a commercially suitable chrome rinse system that can thereafter be followed by an economical and efficient topcoat operation. It would moreover be most particularly desirable to obtain all such features while providing a phosphatized coating having topcoat compatability with a great variety of solvent based topcoats.

SUMMARY OF THE INVENTION

A highly desirable coating composite for metal substrates, having a phosphatized base coating produced by a dry process, has now been found. In the coating composite, a water-insoluble phosphatized coating has been obtained without sacrifice of advantages provided by solvent phosphatizing. Further, the base coating exhibits the excellent properties associated with phosphatized coatings for metal substrates. A subsequent portion of the composite coating of the present invention can thereby be easily and efficiently formed from water-reducible coatings. The resulting composite has highly desirable properties including enhanced adhesion of the topcoat to the metal substrate, provided by the phosphatized coating.

Because of the nature of the phosphatized coating, it is now possible to protect the underlying metal substrate with a coating composite wherein a chrome rinse system, or the like, based on aqueous medium, is used in conjunction with the phosphatized coating. Thereafter the topcoating, also including the use of water-reducible paints, will provide an adherent and highly corrosion-resistant protective coating system. These advantages are nevertheless achieved while maintaining the flexibility of obtaining a coating composite wherein the metal substrate is protected by a phosphatized coating from a dry phosphatizing process, which base coating may be topcoated with a paint formulated from a wide variety of solvent systems.

Broadly, the present invention is directed to a coated metal substrate having on the surface thereof an adherent, corrosion-resistant and water-insoluble composite coating. The coating comprises a water-insoluble phosphatized base coating on the metal obtained by contacting the substrate with an organic solvent and water-containing phosphatizing composition, containing water in minor amount, and on the base coating a paint topcoating from a paint topcoat composition. The base coating is obtained by contacting the metal substrate with organic phosphatizing composition that comprises organic solvent providing liquid phase homogeneity with an organic solubilizing liquid while being a nonsolvent for a phosphatizing proportion of phosphoric acid in the composition; the organic solvent is unreactive with phosphoric acid in the composition. The phosphatizing composition further comprises a solubilizing liquid capable of solubilizing phosphoric acid in the composition while retaining liquid phase composition homogeneity, and with the solubilizing liquid being unreactive with phosphoric acid in the composition. Further the composition comprises a phosphatizing proportion of phosphoric acid, and water in an amount exceeding the proportion of phosphoric acid while being sufficient for the composition to provide a phosphatized coating of substantial water insolubility on a metal substrate in phosphatizing contact with such composition and while retaining liquid phase homogeneity.

The water-insoluble base coating ona ferruginous substrate will be a complex phosphatized coating of the iron phosphate type, and contain, in addition to trace elements, the elements iron, phosphorous, and oxygen plus carbon and nitrogen, and have a coating surface ratio of oxygen atoms to phosphorous atoms of at least about 4:1, and a coating surface ratio of carbon atoms to phosphorous atoms of greater than about 1.5:1.

An additional invention aspect includes the foregoing coated metal substrates further having a chromium-containing coating on the base coating. Other aspects include the processes for obtaining all of such coated substrates.

DESCRIPTION OF THE PREFERRED EMBODIMENTS

The coating composite is initiated with a base coating on the metal substrate from an organic phosphatizing composition. Such composition will contain, along with other constituents, an organic solvent. This solvent, or "solvent constituency" as it is sometimes referred to herein, is typically commercially available material and may contain additional ingredients, although the use of more purified substance is contemplated. For example, commercial 1,1,1-trichlorethane may contain very minor amounts of stabilizers such as 1,2-butylene oxide. It is further contemplated to use blends of organic solvents. Preferably, combined solvents will form an azeotrope. Alone or in combination these solvents are such as will not solubilize a phosphatizing proportion of phosphoric acid; this phosphoric acid insolubility will be characteristic of the solvent even at the boiling point, as for example of the azeotrope at normal pressure. For suitable acid solubility, a solubilizing liquid is needed. The organic solvent will generally provide the major amount of the phosphatizing solution and will typically provide between about 60 to about 90 weight percent of such solution. However, this is not always the case. Most always, when the organic solvent does not form the major amount, the solubilizing liquid will be the predominant substituent in the solution.

Most preferably for efficient formation of the phosphatized base coating, the organic solvent is liquid at normal pressure and temperature and has a boiling point at normal pressure above about 35° C. Solvents that are contemplated for use are the chlorinated solvents such as 1,1,1-trichlorethane, fluorine-containing hydrocarbon solvents, e.g., trichlorofluoromethane, solvents containing only hydrogen and carbon, including aliphatic solvents such as n-heptane and aromatic liquids of which benzene is exemplary, as well as high boiling nitrogen-containing compounds which would include 1-terbutylpiperidine, and further the aliphatic ketones, such as ethyl butyl ketone, having molecular weight above about 100 and below 200. Other useful organic solvents in addition to these mentioned hereinabove include carbon disulfide, chlorobenzene, chloroform, 1,1,3-trichlorotrifluoroethane, perchloroethylene, toluene and trichloroethylene, as well as the inert and homogeneous liquid mixtures of all azeotropic mixtures. By being inert, it is meant that such mixtures do not chemically react with one another, or with other substituents of the phosphatizing composition, so as to retard or interfere with desirable phosphatizing operation of the composition. This characteristic of being inert carries through even at the temperature attained for the solution to be at boiling condition. Preferably, for efficient and economical base coating preparation, the organic solvent is methylene chloride. Useful phosphatizing composition dependent upon methylene chloride as the organic solvent have been more particularly described in copending U.S. patent application Ser. No. 560,378, now U.S. Pat. No. 4,008,101.

The solubilizing liquid needs to be one or a mixture that is capable of solubilizing phosphoric acid in the organic solvent while retaining homogeneity. The solubilizing liquid should be unreactive with phosphoric acid, e.g., not chemically react with the acid even at the composition temperatures achieved during phosphatizing operation. The solubilizing liquid can be, and on occasion most desirably is, a blend of organic substances. It is further preferred, for efficient phosphatizing operation, that the solubilizing liquid have a boiling point higher than the boiling point of the organic solvent, or that on boiling, it form an azeotrope with such solvent. Since the organic solvent even as a vapor in a rinse zone will exert little solubilizing activity toward the phosphoric acid, it is desirable to have vapor from the solubilizing liquid also present in the rinse zone.

Most advantageously for efficiency of base coat formation, the solubilizing liquid is an alcohol having less than six carbon atoms. Alcohols of six carbon atoms or more may be used, but should always be present in minor amount with at least one less than six carbon atom alcohol being in major amount. Representative alcohols that can be or have been used include methanol, ethanol, isopropanol, n-pentanol, n-propanol, n-butanol, allyl alcohol, sec-butanol, tert-butanol and their mixtures wherein liquid phase homogeneity is maintained when in mixture with organic solvent. However, additional substances, e.g., 2-butoxyethanol, can also be serviceable, alone or in combination with alcohol. As mentioned hereinabove, useful phosphatizing solutions can be achieved when the solvent provides the predominant constituent of the phosphatizing composition.

As discussed hereinabove, phorphoric acid will have only an extremely limited solubility in the organic solvent. However, this situation is obviated by using the solubilizing liquid. Therefore, although the phosphoric acid is a critical ingredient that is generally present in a very minor amount, with the solubilizing liquid present in the phosphatizing solution the phosphoric acid may be contained in the phosphatizing solution in substantial amount. Such amount might be up to 2–3 weight percent or more. But, for efficient and economical coating operation, the phosphoric acid is generally used in an amount below about one weight percent, basis total weight of the phosphatizing composition. A much greater amount than about 1%, will typically leave a composite base coating on the metal substrate that is tacky to the touch. Preferably, for most efficient coating operation, the phosphoric acid is present in an amount between about 0.2–0.8 weight percent, basis the phosphatizing solution, although an amount below even 0.1 weight percent can be serviceable.

If it is contemplated that the coated metal substrate obtained by the present invention will be achieved with a metal that has been heretofore recognized as susceptible to phosphatizing, i.e., capable of readily reacting with phosphoric acid. Thus, it is contemplated that the coating composite will be useful for protecting aluminum, zinc, cadmium and tin substrates as well as the more typical ferruginous (ferrous) metal substrates including steel such as cold-rolled steel. The "phosphatizing proportion of phosphoric acid", as such term is used herein, may well be a "phosphatizing substance", as it might more appropriately be termed. That is, it is not meant to exclude any solvent phosphatizing art substances that may be, or have been, useful for providing the phosphate base coating. Such substances might include organic phosphate substance as well as the more typical acidic substances of phosphorous and salts of such acids. Preferably, for economy, orthosphosphoric acid is used. In base coating formation, water is present in the phosphatizing composition in an amount sufficient to provide for the coating on ferrous metal to have substantial water insolubility. As is discussed in greater detail hereinbelow, this means that the coating will be, at most, about 20% water soluble. On the other hand, water may typically be present in an amount as great as water saturation of the phosphatizing solution, at the temperature of phosphatizing. Saturation is not exceeded as the solution will then lose liquid phase homogeneity, and the separate water phase may attract phosphoric acid into such phase, to the detriment of further base coating formation. For many phosphatizing solutions, on the one hand water insoluble coatings are achieved, coupled with an acceptable coating weight, when the water content of the solution reaches about one to two weight percent. On the other hand, phase separation for many solutions can occur when the water content reaches about 5–7 weight percent, basis total solution weight. Since the solubilizing liquid can affect the ability of a phosphatizing solution to solubilize water, then especially those solutions wherein the solubilizing liquid predominates, may be solutions able to contain substantial amounts of water, for example 10–25 weight percent of water might be reached without achieving saturation. But the water will always provide a minor weight amount of the phosphatizing solution.

Water in the solution will exert a vapor pressure; the solution water content will thereby directly influence the water content of the vapor zone associated with the solution. When such zone is over a bath of phosphatizing solution, a substantial amount of water vapor may retard the drying time of base-coated metal substrates that are phosphatized in the bath and then removed to the vapor zone for drying. Thus attention to the water content of a bath, when such might exceed about the 5–10 weight percent range is advisable. Since water is present in the phosphatizing solution in an amount in excess of phosphoric acid, it will most always be present in an amount within the range of about 1–6 weight percent.

Basic to the "phosphatizing solution" or "phosphatizing composition" for base coat formation, and as such terms are used herein, are the organic solvent, solubilizing liquid, phosphatizing proportion of phosphoric acid, and the water. A further substance that may be present in the phosphatizing solution is an aprotic organic substance. Although it is contemplated to use aprotic polar organic compounds for such substance, it is preferred for efficient coating operation to use dipolar aprotic organic compounds. These compounds act in the coating solution to retard the formation of an undesirable, grainy coating. Such compound will most always be present in minor weight amounts of the phosphatizing solution, and generally present in an amount less than the amount of the solubilizing liquid, although serviceable phosphatizing solutions can be prepared that contain on the order of ten to fifteen weight percent or more of such aprotic organic compound.

It is preferred, for extended retention of the aprotic organic compound in the phosphatizing solution during base coat formation, that such compound have a boiling point above the boiling point of the organic solvent in the solution. Preferably, such compound boils at least about 20° C. higher than the organic solvent. The aprotic organic compound is often a nitrogen-containing compound; these plus other useful compounds include N,N-dimethylformamide, dimethyl sulfoxide, acetonitrile, acetone, nitromethane, nitrobenzene, tetramethylenesulfone and their inert and homogeneous liquid mixtures where such exist. By being inert, it is meant that such mixtures do not contain substituents that will chemically react, in the phosphatizing solution, to retard desirable phosphatizing operation during base coat formation at the temperature attained for the solution to be at boiling condition. Dimethyl sulfoxide is useful as an aprotic organic compound; but, such may further be used as an accelerator compound, as is discussed herein below. In such case when the dimethyl sulfoxide is present as an accelerator compound, substance other than dimethyl sulfoxide is used to supply aprotic organic compound.

Another substance generally found in the phosphatizing composition is the organic accelerator compound. Such compound serves to increase the rate of formation of the base coating during the phosphatizing process and typically acts in such manner even when present in the composition in very minor amount, as for example, in amount much less than one weight percent basis total composition weight. Advantageously, for efficient operation, the accelerator compound has a boiling point greater than the boiling point of the organic solvent. Many of the useful accelerator compounds are nitrogen-containing organic compounds. More specifically, compounds that can be, or have been, used include urea, pyridine, thiourea, dimethyl sulfoxide, dimethyl isobutylene amine, ethylenediaminetetraacetic acid and dinitrotoluene.

The use of stabilizers has been taught in the prior art and may be used in the phosphatizing solution during base coat formation, such as the hydrogen and hydrogen chloride acceptor substituents that can retard the corrosive nature of phosphatizing compositions. Stabilizers against oxidation of a halohydrocarbon, for example, are also known. These might likewise assist in reducing the corrosive nature of the phosphatizing composition. Useful substances can include p-benzoquinone, p-tertiaryamyl phenol, thymol, hydroquinone and hydroquinone monomethyl ether.

The base coating may be achieved in any of the phosphatizing operations that can be, or have been, used with solvent phosphatizing. Solvent phosphatizing operations can provide, quickly and efficiently, dry, coated metal substrates, and thus, such operations will most always provide for quickly achieving same. Sequentially, metal articles for base coating may be typically degreased in degreasing solution and then immersed in a bath of the phosphatizing composition with such bath being most always heated to boiling condition. The base-coated article, upon removal from the bath, might best then be maintained in the vapor zone above the bath for evaporating volatile constituents from the base-coated article to coating dryness. During such maintenance, the article may be subjected to a spray rinse. Base coating formation may also be achieved by spray application to a metal article, such as in a vapor zone that might be formed and/or replenished by vapor from the spray composition. Other operations for base coat formation include initial rinsing of a metal article with warm rinse liquid, e.g., immersion rinsing. Such rinsing is then followed by phosphatizing, and this can be further followed by an additional rinse in the warm rinse liquid. For efficiency in all operations for base coating formation, the temperature of the phosphatizing composition is maintained at boiling condition.

The base coating of the composite is typically present in an amount of twenty milligrams per square foot or more on ferrous metal. The base-coating weights, in milligrams per square foot, can be on the order of as low as ten to twenty to be acceptable, i.e., provide incipient corrosion protection with initial enhancement of topcoat adhesion, and generally on the order of as great as one hundred to one hundred and fifty although much greater weights, e.g., two hundred to three hundred or so, are contemplated. Preferably, for best coating characteristics including augmented topcoat adhesion and corrosion protection, the base coating will be present in an amount between about 20–100 milligrams per square foot.

The base coating on ferrous metal will have at least substantial water insolubility, and hence are also termed herein to be "water-resistant" coatings. For determining water insolubility, the test employed is a quantitative "water soak test". The test is described more specifically in connection with the examples. Advantageously, for enhanced corrosion protection, the base coating will be on the order of less than 20% water soluble as determined by the water soak test. Such a base coating, for convenience, is often termed herein as a "phosphatized coating of substantial water insolubility". Preferably, for best coated metal substrate protection, especially when the topcoating is from a water-based topcoat composition, the water solubility of the coating will be less than 5%, basis total weight of the original coating. In typical base coat formation, the coating on ferruginous surfaces will have virtually no water solubility as determined by the water soak test.

Because of the water resistant nature of the phosphate coating, the resulting coated metal substrates are especially adapted for further treatment with water based coating and treating systems. For example, the base coated substrates may be further treated with acidified aqueous solutions typically containing a multivalent metal salt or acid in solution, such as a dilute solution of chromic acid in water. Such treating solutions can be the simplistic chromic acid rinse solutions of chromic acid and water as mentioned in U.S. Pat. Nos. 3,116,178 or 2,882,189 as well as their equivalent solutions such as the molybdic and vanadic acid solutions discussed in U.S. Pat. No. 3,351,504. Further, such treating solutions may be non-aqueous, it being contemplated to use chromic acid solutions such as disclosed in U.S. Pat. No. 2,927,046. The treatment can include solutions containing additional, reactive ingredients such as the combination of chromic acid and formaldehyde disclosed in U.S. Pat. No. 3,063,877. Additional treatments that are contemplated include the complex chromic-chromates from solutions typically containing trivalent chromium, as has been discussed in U.S. Pat. No. 3,279,958. Further treatments that can be used include such as the blended complex chromate salts disclosed in U.S. Pat. No. 3,864,175 as well as solutions containing salts of other metals, as exemplified in U.S. Pat. No. 3,720,547, wherein salts of manganese are employed in treating solutions. All of these treatments will generally provide a coating having a weight of from about 2 to about 40 milligrams per square foot of treated substrate, although such weight may be lower, and is often greater, e.g., 100 milligrams per square foot or more. For convenience, these treatments and solutions collectively are sometimes referred to herein as "non-phosphatizing solutions for treating metal substrates".

In addition to previously noted characteristics, coatings have been subjected to further analysis. As detailed more specifically in the examples, coatings of the iron phosphate type have been subjected to analysis by the Electron Spectroscopy for Chemical Analysis (ESCA) technique. For convenience, this may be referred to simply as "spectroscopic analysis." Such analysis confirms that the water insoluble coatings obtained on a ferruginous substrate, contain in their make-up, elements such as sodium in trace amounts. That is, in an amount typically less than about 0.5 percent basis total coating surface atoms. The balance of the elements is provided by phosphorous, iron, oxygen, carbon and nitrogen. Moreover, the coating surface ratio of carbon atoms to phosphorous atoms is greater than about 1.5:1. In the coating surface the nitrogen atoms plus the iron atoms individually are present in more than trace amount, typically on the order of a few percent or more, and together generally total less than about ten to fifteen percent, basis total coating surface atoms. The coating will generally have a surface ratio of carbon atoms to phosphorous atoms of greater than about 2:1, and will have a surface ratio of oxygen atoms to phosphorous atoms of at least about 4:1. Under similar analysis, comparative phosphatized coatings, which are water soluble coatings prepared from prior art phosphatizing techniques based on chlorinated hydrocarbon phosphatizing methods, fail to show such combination of elements in a phosphatized coating. Although all of the coatings are complex, because of the nature of the spectroscopic analysis techniques used in analyzing the coating, the make-up of the coating under analysis is expressed in the form of the elements. That is, it is to be understood that the coating is basically and completely defined by setting forth the elements. Although the elements will or may form various bonding relationships, the coating as defined by the elements is not limited to various particular relationships.

The treatment of the phosphate coating can be preparatory to electropainting of the coated substrate. For example, as discussed in U.S. Pat. No. 3,502,511, the rinsing of a phosphated metal article with a dilute aqueous solution of zinc dichromate can then suitably prepare such article for electropainting. A variety of hexavalent-chromium-containing solutions for treating a phosphatized metal surface prior to electropainting has also been disclosed in U.S. Pat. No. 3,454,483. The electrodeposition of film-forming materials is well known and for such coatings in the composites of the present invention, they can include electrocoating of simply a film-forming material in a bath where such a bath may contain one or more pigments, metallic particles, drying oils, dyes, extenders and the like. Representative film-forming systems of this nature are set forth, for example, in U.S. Pat. Nos. 3,304,250 and 3,455,805. Also, substances of particular interest, for example in the automotive industry, are the anodically deposited film-forming materials as exemplified by U.S. Pat. No.

3,230,162. Included in these composite coating systems there can be an electrophoretically deposited zinc paint. In U.S. Pat. No. 3,464,906 a zinc paint that can be electrodeposited and contains water-soluble or dispersible resin as a binder in aqueous medium, is taught.

Other topcoat paint compositions that are often aqueous based and therefore of special interest for the present invention are primers that can enhance corrosion protection of the underlying substrate by containing pulverulent metals such as pulverulent zinc. For example, it has already been shown in U.S. Pat. No. 3,671,331, that a primer topcoating containing a particulate, electrically conductive pigment, such as zinc, is highly serviceable for a metal substrate that has been first treated. Like topcoating systems of special consideration have been referred to in the prior art, most ostensibly for convenience, as "silicate coatings". These appear to be aqueous systems that contain a finely divided metal such as powdered zinc or aluminum, lead, titanium or iron plus a water soluble or water dispersible binder. Representative of the binders are alkali metal silicates, an organic silicate ester, or a colloidal silica sol. Thus, U.S. Pat. No. 3,372,038 shows an aqueous coating system for providing corrosion resistance to metal substrates with a formulation containing a finely divided zinc powder plus an organic ammonium silicate. In U.S. Pat. No. 2,944,919 as aqueous based coating composition is shown that contains a sodium silicate and may further contain a finely divided metal in addition to zinc, such as magnesium, aluminum, manganese and titanium.

The present invention is further of particular interest for coated metal substrates wherein the topcoat of the composite is a water-reducible coating. Such coatings have been developed especially for industrial use in view of the advent of pollution requirements. Although being water-based, such water-reducible coatings are generally not free of other solvent but are nevertheless formulated to comply with existing federal legislation. These coatings that can or have been used in forming coated metal substrates of the present invention include water-reducible alkyds, water-reducible polyester coatings and coatings of the water-reducible acrylic type, with the respective polymers being typically solubilized with organic amine.

It is further contemplated that the coating composites include, as topcoats either on the phosphatized metal surface or on such surfaces that have been treated with non-phosphatizing solutions, as discussed hereinabove, or treated and further coated, one or more additional paint topcoating compositions. Such topcoating compositions can include any of the more typical paints, i.e., a paint, primer enamel, varnish, or lacquer. Such paints may contain pigment in a binder or can be unpigmented, e.g., generally cellulose lacquers, rosin varnishes, and the like. The paints are typically solvent reduced but can be water-reduced latex paints and can further include oil paints.

Before applying the phosphate coating, it is advisable to remove foreign matter from the metal surface by cleaning and degreasing. Although degreasing may be accomplished with commercial alkaline cleaning agents which combine washing and mild abrasive treatments, the cleaning will generally include degreasing accomplished with typical degreasing solvents.

The following examples show ways in which the invention has been practiced but should not be construed as limiting the invention. In the examples all parts are parts by weight unless otherwise specifically stated. In the examples the following procedures have been employed.

Preparation of Test Panels

Bare steel test panels, typically 6" × 4" unless otherwise specified, and all being cold rolled, low carbon steel panels are typically prepared for phosphatizing by degreasing for 15 seconds in a commercial, methylene chloride degreasing solution maintained at about 104° F. Panels are removed from the solution permitted to dry in the vapor above the solution, and are thereafter ready for phosphatizing.

Phosphatizing of Test Panels and Coating Weight

In the examples, cleaned and degreased steel panels are phosphatized by typically immersing the panels into hot phosphatizing solution maintained at its boiling point, for from one to three minutes each. Panels removed from the solution pass through the vapor zone above the phosphatizing solution until liquid drains from the panel; dry panels are then removed from the vapor zone.

Unless otherwise specified, the phosphatized coating weight for selected panels, expressed as weight per unit of surface area, is determined by first weighing the coated panel and then stripping the coating by immersing the coated panel in an aqueous solution of 5% chromic acid which is heated to 160°-180° F. during immersion. After panel immersion in the chromic acid solution for 5 minutes, the stripped panel is removed, rinsed first with water, then acetone, and air dried. Upon reweighing, coating weight determinations are readily calculated. Coating weights are expressed in milligrams per square foot (mg/ft.$^2$).

Mandrel Test Bending (ASTM D-522)

The conical mandrel test is carried out by the procedure of ASTM D-522. Briefly, the testing method consists in deforming a paint-coated metal panel by fastening the panel tangentially to the surface of a conical steel mandrel and forcing the sheet to conform to the shape of the mandrel by means of a roller bearing, rotatable about the long axis of the cone and disposed at the angle of the conical surface, the angle of deformation or arc travel of the roller bearing being approximately 180°. Following the deformation, a strip of glass fiber tape coated with a pressure-sensitive adhesive is pressed against the painted surface on the deformed portion of the test panel and is then quickly removed. The paint removed by the adhesive on the tape is measured in millimeters from the apex of the conical bend.

Reverse Impact (ASTM D-2794-69)

In the reverse impact test, a metal ram of specific weight, in pounds, with a hemispherical contact surface is allowed to drop from a predetermined height in inches onto the test panel. Paint removal is measured qualitatively or quantitatively on the convex (reverse) surface. In the qualitative measurement the impacted surface is merely observed by visual inspection and comparative panels, i.e., those subjected to the same impact in inch-pounds, are rated according to a numerical scale presented hereinbelow in the examples.

Cross-Hatch

This test is conducted by scribing, through the coating to the metal panel with a sharp knife, a first set of parallel lines one-eighth inch apart. A second, similar set of lines, is then scribed on the panel at right angles to the first set. Following this, a strip of glass fiber tape coated with a pressure-sensitive adhesive is pressed against the painted surface on the scribed portion of the test panel and is then quickly removed. The coating is rated in accordance with the above-mentioned numerical scale that is presented hereinbelow, based on the amount of paint removed by the adhesive on the tape.

Corrosion Resistance Test ASTM B-117-64

Corrosion resistance of coated panels is measured by means of the standard salt spray (fog) test for paints and varnishes, ASTM B-117-64. In this test, the panels are placed in a chamber kept at constant temperature where they are exposed to a fine spray (fog) of a 5% salt solution for specified periods of time, rinsed in water and dried. The extent of corrosion on the test panels are then compared one with the other by visual inspection.

Relative Humidity Test ASTM D-1748

In this test water is heated in the bottom of a cabinet, and/or air is bubbled into the water at the bottom of the cabinet, to produce a condition of 100 percent humidity in the cabinet. The temperature for the ambient steam within the cabinet is 120° F. Panels are suspended vertically in the cabinet on a rotatable frame above the water surface; the bottom edge of a 4" × 6" panel is about 14 inches above the water surface. To terminate the test, panels are removed for inspection at the times shown in the appropriate example below. Upon removal, panels are air dried and visually inspected for blisters on the face of the panel and around the panel edges. Panels are rated using ASTM D-714-56.

EXAMPLE 1

To 76.3 parts of a stabilized, commercially available technical grade of methylene chloride there is added, with vigorous agitation, 16.3 parts methanol, 0.43 parts ortho phosphoric acid, 3.0 parts N,N-dimethylformamide, 3.9 parts water and 0.07 part dinitrotoluene. These blended ingredients are thereafter brought to reflux and the resulting solution is then used to phosphatize panels in the manner described hereinabove. For test purposes, panels having a 30 mg/ft.$^2$ phosphatized coating weight are used.

The resulting phosphatized panels, as well as some additional of the above-described bare steel test panels, used for comparative purposes, are all coated with a standard metal coating primer. More particularly, the primer is a gray zinc chromate primer number 63-12519 that is commercially available from DuPont. The phosphatized panels are not thereafter coated. However, the bare steel panels with the zinc chromate primer, are further topcoated with a solvent-based acrylic enamel. This is an off-white enamel number E525 that is also commercially available from DuPont.

A set of two resulting panels are then tested in the above-described cross-hatch test, which uses seventeen scribe lines per inch: another set of two panels are tested in the above-described conical mandrel test. Results of such testing are reported in the Table below. Results are also reported in the Table for the reverse impact test at 40 inch-pounds; these results for reverse impact, as well as for the cross-hatch test, are reported numerically using the following rating system:

(10) complete retention of film, exceptionally good for the test used;
(8) some initial coating degradation;
(6) moderate loss of film integrity;
(4) significant film loss, inacceptable degradation of film integrity;
(2) some coating retention only;
(0) complete film loss.

Results are also reported for panels subjected to the above-described relative humidity test. In this test, panels are subjected to 24 hour exposure.

TABLE

| Panel | Cross-Hatch | Conical Mandrel (mm.) | Reverse Impact | Relative Humidity (Blisters) |
|---|---|---|---|---|
| Zinc Chromate Primed | 10 | 48 | 5 | #6, med.-dense |
| Phosphatized | 10 | 33 | 7 | No blisters |

The results show the highly desirable topcoat adhesion characteristic for the solvent phosphatized panels. This is for the phosphatized panels having a coating that, although it is water-insoluble, will also provide excellent topcoat adhesion for solvent-reduced topcoats. The results are particularly desirable since the total paint film thickness for the phosphatized test panels is measured at 0.7 mil, versus a total film thickness for the zinc chromate primed panels of 1.75 mils. Such measurements are determined by subjecting the panels to a Permascope, type ES-4, which operates by magnetic permeability and is available from Twin City Testing Corporation.

EXAMPLE 2

A phosphatizing solution is prepared from 7510 parts of methylene chloride, 1731 parts methanol, 5 parts ortho phosphoric acid, 374 parts N,N-dimethyl formamide, and 7 parts dinitrotoluene. Prior to phosphatizing of steel panels the water content of the phosphatizing bath is determined to be 373 parts. This water content is directly determined by gas chromatograph analysis of a sample wherein the column packing is Porapak Q manufactured by Waters Associates, Inc.

A panel coated in the phosphatizing solution is subjected to the water solubility test. For this test the panel is weighed and then immersed in distilled water for ten minutes, the water being maintained at ambient temperature and with no agitation. Thereafter, the test panel is removed from the water, rinsed in acetone and air dried. Subsequently, on reweighing, the amount of water solubility of the coating is shown by the weight loss. This loss, basis total original coating weight, is reported as a percentage of coating loss. Such testing shows the panel to have a degree of solubility in water of below 5%. Coating weights for similar panels, but phosphatized for different coating times, are determined to be 35 mg/ft.$^2$ for one panel (lower coating weight) and 60 mg/ft.$^2$ for another panel (higher coating weight).

One of each panel of the lower and the higher coating weight is then selected for analysis by the Electron Spectroscopy for Chemical Analysis (ESCA) technique. This technique is used to evaluate the surface phenomena of the coated panels by providing a determination of the elements present. The instrument used is the HP 5950A, a spectrometer system with monochromatized X-radiation and manufactured by the Hewlett Packard Company. Under such evaluation, the surface of test panels is found to contain sodium and calcium in trace amounts and a balance of phosphorous, iron, oxygen, carbon and nitrogen.

Such determination for the principal elements found in the phosphatized coating is further evaluated, using similar test panels, with Auger spectroscopy. For this analysis the instrument used in the PHI Model 540A thin film analyzer manufactured by Physical Electronics Industries, Inc. Such analysis confirms the presence at the surface of the test panels of the elements phosphorous, iron, oxygen, carbon and nitrogen.

EXAMPLE 3

Additional phosphatized panels, prepared as described hereinabove to contain 32 mg/ft.$^2$ of phosphate coating, are further rinsed in a dilute solution of chromic acid. This provides the test panels with a chromic acid rinse coating of 7 mg/ft.$^2$ as determined by coating weight increase.

Selected panels that have been thus phosphatized and chrome rinsed are then electrocoated with an electropaint primer No. EXM-72014D of the Glidden-Durkee Division of SCM Corporation. This electropaint primer is applied to a thickness of 0.5 mil and is subsequently baked for ten minutes at 425° F. Over this, there is applied a topcoat primer No. EGL-74030, also from the Glidden-Durkee Division of SCM Corporation. This topcoat is applied to a thickness of 1.0 mil and is baked for 15 minutes at 375° F.

One of the electropainted and topcoated panels is subjected to the ASTM D2248-73 detergent-resistance test. The panel is found to pass such test. Passage is determined by subjecting the panel to the test for 240 hours, and by the face of the panel after such testing, having no more than 5% of No. 8 blisters. A similarly electropaint primed and topcoated panel, subjected to the above-described salt spray testing, is found on the face of the panel to be free of blisters after 500 hours of such testing.

EXAMPLE 4

In the manner described hereinabove, a phosphatizing solution is prepared to contain, by weight, the following ingredients: 4.1 parts of water, 76.5 parts methylene chloride, 16.5 parts methanol, 0.24 part ortho phosphoric acid, 3.0 parts N,N-dimethylformamide and 0.06 part dinitrotoluene. Steel panels are phosphatized in this organic phosphatized panels. Hereinafter, for convenience, the resulting phosphatized panels are referred to as the invention phosphatized panels.

Further, in the manner described hereinbefore, but for comparative purposes, panels are phosphatized in a well-known and extensively-used commercial phosphatizing bath based on trichloroethylene. Hereinafter for convenience, these panels are referred to as the "standard phosphatized panels". The commercial organic phosphatizing composition was prepared by blending together ortho phosphoric acid, with two products sold under the tradenames of "Triclene-L" and "Triclene-R", to contain a commercially acceptable amount of phosphoric acid in the blend. The use of such a commercial phosphatizing bath has been described, for example, in U.S. Pat. No. 3,356,540.

Standard phosphatized panels as well as invention phosphatized panels are prepared with coating weights of either 60 mg/ft.$^2$ or 80 mg/ft$^2$. All panels are then topcoated with a black baking enamel.

This enamel is a commercial, black alkyd baking enamel; the enamel ostensibly contains a soya alkyd resin along with 2% carbon black solids. After coating panels with the enamel, the coating is cured on all panels by baking in a convection oven for 25 minutes at a temperature of 275° F.

All resulting panels were then placed outdoors for three months in a tropical climate at a test site located about 10 miles inland from the Atlantic Ocean. After such testing, representative panels are taken and subjected to the above-described cross-hatch, conical mandrel, and reverse impact tests, with only one panel being subjected to one test. From the results of such testing, it is determined that the invention phosphatized panels have the same desirable topcoat adhesion for a solvent-reduced baking enamel, tested against outdoor exposure, as can standard phosphatized panels produced in accordance with existing commercial operation.

EXAMPLE 5

A comparative formulation, prepared for test purposes, was made in accordance with Example 3 of West German Pat. No. 1,222,351, by blending together 700 parts ethanol, 4.7 parts phosphoric acid, 7.8 parts water, 6,050 parts trichloroethylene and 0.15 part of dimethyl glyoxime. The 4.7 parts of phosphoric acid were 4.7 parts of 100% acid in accordance with the teachings of the patent that the composition concentration of the phosphoric acid is calculated on the basis of 100% acid. The ethanol used was 200 proof ethanol whereby the 7.8 parts of water used is equivalent to the 1.56 grams of the Patent's Example 1.

The water content of the resulting composition was determined as 0.11 weight percent using the method described in Example 2. The resulting composition is identified in the Table hereinbelow initially as an "Ex. 3, 200 proof" bath and then further by said 0.11% water content.

A substantial replicate to the aforedescribed formulation, also prepared for comparative purposes, was made in accordance with the Example 3 of the West German Patent, with the exception that the 700 parts ethanol used was the typical commercial 190 proof ethanol thereby supplying sufficient additional water to the replicate formulation to provide a second phosphatizing solution having 0.65 weight percent water, as determined by the aforedescribed method. This second solution is referred to in the Table as an "Ex. 3, 190 proof" composition further identified by such 0.65% water content.

A phosphatizing composition, identified in the Table as the "New Composition" or "New Comp.", was prepared by blending together 4,436 parts methylene chloride, 958.4 parts methanol, 221.5 parts water, 27.3 parts of 100% phosphoric acid, and 204.4 parts N,N-dimethylformamide. On analysis, as abovedescribed, the New Comp. was found to contain 3.9 weight percent water.

The Example 3 bath with the 0.11 weight percent water content was heated to a temperature near its boiling point, being a temperature of 164° F., and also prior to use the Example 3 replicate bath with the 0.65 weight percent water content was likewise heated to a temperature near its boiling point, being a temperature of 158° F. Steel test panels were held in the vapor zone above the bath for 30 seconds, then dipped from the vapor zone and immersed in the bath below the zone for a dip time of 3 minutes, the panel being then removed from the bath, maintained in the vapor above the bath for 15 seconds, removed from such vapor above the bath and dipped into a beaker of trichloroethylene solvent as ambient temperature for 15 seconds to provide condensate rinse and cool the panel.

The New Composition was heated to about its boiling temperature, being a temperature of 102° F. Steel panels were then held in the vapor zone in the above described manner, followed by dip coating in the bath for 3 minutes, then removing the panels from the bath and holding them in the vapor zone for 15 seconds, followed by dipping into a beaker of methylene chloride solvent at ambient temperature for 15 seconds.

As shown in the Table below, coating weights and water solubility for coatings, all accomplished as hereinbefore described, are determined for phosphatized panels.

A selected set of coated panels having been cooled for five minutes in the ambient air, were painted with a water-based semigloss latex paint containing 24.6 weight percent pigments that were 19.1% titanium dioxide and 5.5% silicates, and a 75.4 weight percent balance being vehicle that was 22% acrylic resin and 53.4% water. Th paint was applied by first magnetically clamping the panel and then pouring a line of paint across the panel face. The paint is drawn down over the panel with a No. 40, wire-wound steel draw bar followed by immediately setting the panels out for air drying. Five minutes, following the setting out for air drying, the panels are visually inspected. By such inspection, the percentage of the surface area showing rust spots is determined in accordance with the evaluation described in ASTM D 610-68, using the illustrative examples shown therein. The results of such determination are set forth in the Table hereinbelow, with the percentage range for the panels being determined by inspection of both sides.

TABLE

| Bath Ident. | Water Cont. of Coating Bath in Wt. % (and g/l) | Coating Wt. Mg/ft$^2$ | % Coating Water Solubility | % Rusting of Painted Surface |
|---|---|---|---|---|
| Ex. 3 (200 proof) | 0.11% (1.5 g/l) | 2 | N.A. | 80–100% |
| Ex. 3 (190 proof) | 0.65% (8.8 g/l) | 53 | 7% | 30–80% |
| New Comp. | 3.9% | 47 | 8% | 0–5% |

N.A. = Not Applicable

Similar results, although not as dramatic, can be obtained with differing steel panels. As shown in the Table, although the modified Ex. 3 bath, i.e., the 190 proof bath from the West German Patent, will provide a desirable water insoluble coating, the coating does not have the excellent properties of the coating from the New Comp., as exhibited by topcoat performance. Interestingly, on ESCA analysis, the Ex. 3 coat has a surface ratio of oxygen atoms to phosphorus atoms of well below 4:1, and more nearly 3:1.

Comparative testing has also been carried out, but using aqueous formulations. Thus, as an example, the formulation from Example 4 of U.S. Pat. No. 2,837,449, which composition contains formamide in an aqueous phosphatizing formulation, has been prepared and used according to the teachings of such patent. Phosphate coatings are readily achieved. However, on ESCA analysis, it is found that the coating has a surface ratio of carbon atoms to phosphorous atoms of essentially 1:1.

Related comparative testing has been carried out with additional aqueous composition. The formulation containing diethylamine and disclosed in Example 3 of U.S. Pat. No. 3,129,121 has been prepared and used in accordance with the patent teachings to obtain phosphate coatings. But such, on ESCA analysis, are seen to contain surface nitrogen atoms in merely trace amount.

We claim:

1. A coated ferruginous substrate having on the surface thereof an adherent, corrosion-resistant and water-insoluble composite surface coating, which coating comprises a base coating on the substrate surface of a water-insoluble, complex phosphatized coating of the iron phosphate type obtained by contacting said ferruginous substrate with an organic solvent and water-containing liquid phosphatizing composition containing water in minor amount but in an amount exceeding phosphoric acid in said composition while being sufficient for said composition to provide a phosphatized coating of substantial water insolubility, said coating containing, in addition to trace elements, the elements iron, phosphorous, and oxygen plus carbon and nitrogen, and having a coating surface ratio of oxygen atoms to phosphorous atoms of at least about 4:1, and a coating surface ratio of carbon atoms to phosphorous atoms of greater than about 1.5:1, and on said base coating a paint topcoating from a paint topcoat composition.

2. The coated substrate of claim 1 wherein said paint topcoat composition is a water-reducible paint coating composition.

3. The coated substrate of claim 1 wherein said ferruginous substrate is a steel substrate and the base coating on said substrate is present in an amount between about 10 and about 200 milligrams per square foot.

4. A coated metal substrate having on the surface thereof an adherent, corrosion-resistant and water-insoluble composite coating, which coating comprises a water-insoluble phosphatized base coating on the metal obtained by contacting said metal substrate with an organic solvent and water-containing liquid composition containing water in minor amount, said coating containing, in addition to trace elements, the element iron, phosphorous and oxygen plus carbon and nitrogen, and having a coating surface ratio of oxygen atoms to phosphorous atoms of at least about 4:1, and a coating surface ratio of carbon atoms to phosphorous atoms of greater than 1.5:1, and on said base coating a paint topcoating from a paint topcoat compositon, with said base coating being obtained by contacting said metal substrate with organic phosphatizing composition comprising:

(A) organic solvent providing liquid phase homogeneity with an organic solubilizing liquid while being a nonsolvent for a phosphatizing proportion of phosphoric acid in said composition, said organic solvent being unreactive with phosphoric acid in said composition;

(B) solubilizing liquid capable of solubilizing phosphoric acid in said composition while retaining liquid phase composition homogeneity, said solubilizing liquid being unreactive with phosphoric acid in said composition;

(C) a phosphatizing proportion of phosphoric acid; and, (D) water in an amount exceeding said proportion of phosphoric acid while being sufficient for said composition to provide a phosphatized coating of substantial water insolubility on a metal substrate in phosphatizing contact with said composition, and while retaining liquid phase homogeneity.

5. The coated substrate of claim 4 wherein said paint topcoat composition is a water-reducible paint coating composition.

6. The coated substrate of claim 4 wherein said base coating is a phosphatized coating on a ferruginous substrate from an organic phosphatizing composition containing methylene chloride organic solvent and said base coating is present in an amount between about 10 and about 200 milligrams per square foot.

7. A coated metal substrate having on the surface thereof an adherent, corrosion-resistant and water-insoluble composite coating, which coating comprises a water-insoluble phosphatized base coating on the metal obtained by contacting said metal substrate with an organic solvent and water-containing liquid phosphatizing composition containing water in minor amount, said coating containing in addition to trace elements, the elements iron, phosphorous and oxygen plus carbon and nitrogen, and having a coating surface ratio of oxygen atoms to phosphorous atoms of at least about 4:1, and a coating surface ratio of carbon atoms to phosphorous atoms of greater than about 1.5:1, with the subsequent coating of the composite being from a non-phosphatizing solution for treating metal surfaces and with the topcoating of the composite being a paint coating from a paint topcoat composition, wherein said base coating is obtained by contacting said metal substrate with organic phosphatizing composition comprising:

(A) organic solvent providing liquid phase homogeneity with an organic solubilizing liquid while being a non-solvent for a phosphatizing proportion of phosphoric acid in said composition, said organic solvent being unreactive with phosphoric acid in said composition;

(B) solubilizing liquid capable of solubilizing phosphoric acid in said composition while retaining liquid phase composition homogeneity, said solubilizing liquid being unreactive with phosphoric acid in said composition;

(C) a phosphatizing proportion of phosphoric acid; and, (D) water in an amount exceeding said proportion of phosphoric acid while being sufficient for said composition to provide a phosphatized coating of substantial water insolubility on a metal substrate in phosphatizing contact with said composition, and while retaining liquid phase homogeneity.

8. The coated substrate of claim 7 wherein said base coating is present in an amount between about 10 and about 200 milligrams per square foot, said non-phosphatizing solution for treating metal surface contains chromium and said chromium is present in the subsequent coating in an amount from about 2 to about 40 milligrams per square foot.

9. The coated substrate of claim 7 characterized by having a topcoating from a water-reducible coating composition.

10. The coated substrate of claim 7 wherein said base coating is phosphatized coating from an organic phosphatizing composition containing methylene chloride organic solvent.

11. A coated ferruginous substrate having on the surface thereof an adherent, corrosion-resistant and water-insoluble composite surface coating, which coating comprises a base coating on the substrate surface of a water-insoluble, complex phosphatized coating of the iron phosphate type obtained by contacting said ferruginous substrate with an organic solvent and water-containing liquid phosphatizing composition containing water in minor amount, said coating and containing, in addition to trace elements, the elements iron, phosphorous, and oxygen plus carbon and nitrogen, and having a coating surface ratio of oxygen atoms to phosphorous atoms of at least about 4:1, and a coating surface ratio of carbon atoms to phosphorous atoms of greater than about 1.5:1, with a subsequent coating in the composite being from a non-phosphatizing solution for treating metal surfaces, and with the topcoating of the composite being a paint coating from a paint topcoat composition, wherein the base coating is obtained by contacting said metal substrate with an organic phosphatizing composition comprising methylene chloride, solubilizing solvent capable of solubilizing phosphoric acid in methylene chloride, a phosphatizing proportion of phosphoric acid, and water in an amount exceeding said proportion of phosphoric acid, while being sufficient for said composition to provide a phosphatized coating of substantial water insolubility on said ferruginous substrate, and while and while retaining liquid phase homogeneity.

12. The coated substrate of claim 11 wherein said ferruginous substrate is a steel substrate and the base coating on said substrate is present in an amount between about 10 and about 200 milligrams per square foot.

13. The coated substrate of claim 11 wherein said non-phosphatizing solution for treating metal surfaces contains chromium and said chromium in the subsequent coating is present in an amount from about 2 to about 40 milligrams per square foot.

* * * * *